Nov. 3, 1964 J. F. SEITZ 3,155,978
METHOD OF MAKING MOTION PICTURES
Filed Aug. 8, 1960 2 Sheets-Sheet 1

JOHN F. SEITZ
*INVENTOR.*

BY Hazard & Miller

ATTORNEYS

Nov. 3, 1964  J. F. SEITZ  3,155,978
METHOD OF MAKING MOTION PICTURES
Filed Aug. 8, 1960  2 Sheets-Sheet 2

JOHN F. SEITZ
*INVENTOR.*

BY Hazard & Miller

ATTORNEYS

United States Patent Office 3,155,978
Patented Nov. 3, 1964

3,155,978
METHOD OF MAKING MOTION PICTURES
John F. Seitz, 367 Dal Keith Ave., Los Angeles, Calif.
Filed Aug. 8, 1960, Ser. No. 48,196
1 Claim. (Cl. 352—47)

This invention relates to a method of making motion pictures and of obtaining novel effects therewith by the employment of changing mattes which may change the size and shape of the picture as it is projected on a screen.

Explanatory of the present invention the usual motion picture is taken on film and printed in such a manner that when projected the projected picture occupies the full area of the screen. It has heretofore been proposed to produce motion pictures which when projected, will occupy less than the full area of the screen. In my prior United States Letters Patent No. 2,334,962, issued November 23, 1943, I have disclosed a method of producing motion pictures wherein the basic picture is taken in the conventional manner. This picture is then projected onto a screen and a matte which appropriately frames the picture is simultaneously projected onto the screen. The effect of the matte is to blot out unwanted portions of the picture and to appropriately frame the picture. The projected picture thus framed is then photographed with a camera that is synchronized with the picture projector and the matte projector. Consequently, the picture photographed with the camera when projected on the screen may occupy only a portion of the total available screen area. If the object photographed is quite tall and it is desirable to emphasize its height the projected picture may be quite high in comparison with its width. Conversely, if the projected picture is of a broad panorama, and it is desired to emphasize the vastness of desert wastes, seascapes, and the like, the projected picture may be quite wide in comparison with height. Both types of pictures when projected on the screen occupy only portions of the total available screen area.

It has also been proposed to accomplish generally the same effect by using appropriate frames in conjunction with the camera that takes the basic picture to narrow the picture when it is desired to emphasize height, or to shorten the height of the picture when it is desired to emphasize width. Exact adjustment of such frames in taking pictures in the field has not proven satisfactory.

In accordance with the present invention the mattes employed are of a changing character which may gradually change in size and shape to appropriately frame or emphasize features of the picture. These mattes may be simultaneously projected by the same projector that projects the basic picture onto the screen and by reason of their changing size and shape as the picture advances, a gradual transitional effect from one size to another may be accomplished, thus avoiding abrupt change, except where abrupt changes are desirable.

Another object of the invention is to provide a method of producing motion pictures wherein novel effects are obtainable and wherein two basic pictures, each with their own mattes are simultaneously projected onto a screen. These mattes which may be prepared in the laboratory, may be one the reciprocal of the other. In this manner, one scene may be gradually and continuously reduced in size to a vanishing point while another scene is being enlarged from a vanishing point to the full available area of the screen or any desired portion thereof. Alternatively, the first picture may be allowed to remain occupying the full area of the screen and the succeeding scene can be gradually enlarged from a vanishing point or a vary small area to its desired size. This method of making motion pictures can consequently give new motion effects accomplished by mattes that change as the picture advances combined with reduction or expansion of the picture.

With the foregoing and other objects in view, which will be made manifest in the following detailed description and specifically pointed out in the appended claim, reference is had to the accompanying drawings for an illustrative embodiment of the invention, wherein:

Figure 1:
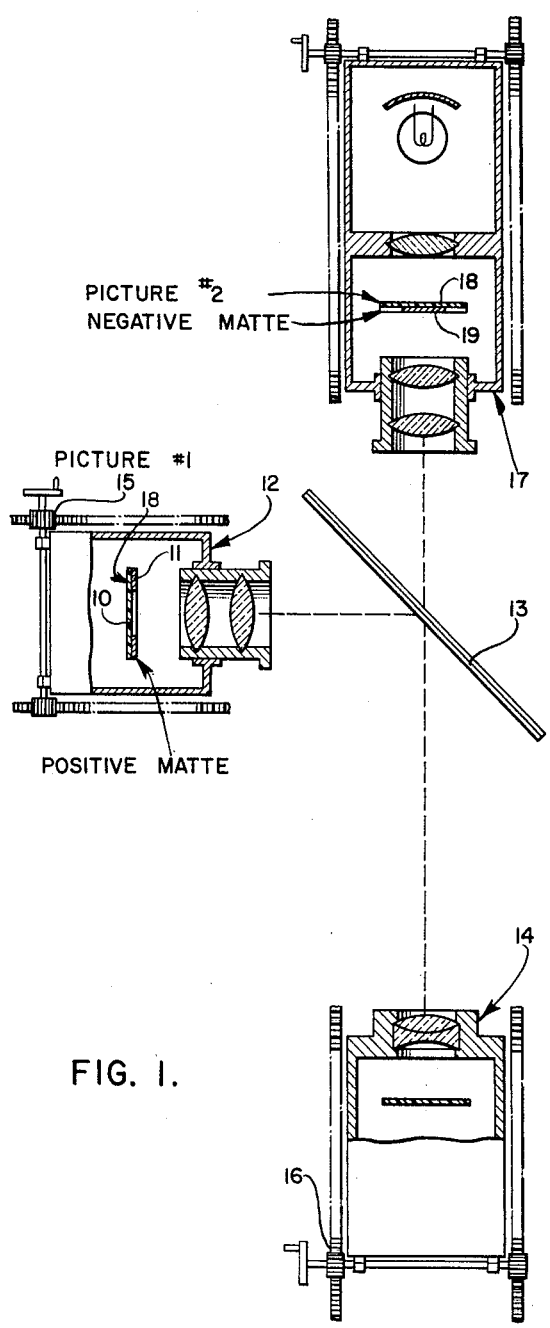
FIGURE 1 is a schematic plan view of apparatus which may be employed in producing motion pictures in accordance with the present method.

Referring to the accompanying drawings wherein similar reference characters designate similar parts throughout, the present invention contemplates taking a basic picture with a motion picture camera in the conventional manner. In taking such a picture no attempt is made to frame the picture or to reduce its size. In other words, the basic picture taken is one which if projected, would occupy the full available area on the picture screen. Thereafter, a print of the picture indicated at 10, together with a positive matte 11 are simultaneously projected by a projector 12 onto a mirror or reflector 13 and the image reflected by the reflector is photographed by a camera 14 that is synchronized with the projector 12. Both the projector 12 and the camera 14 are movable toward or away from the reflector 13, such as by apparatus schematically illustrated at 15 and 16, respectively. The matte 11 may be prepared in the laboratory to appropriate size and shape for the desired portion of the basic picture 10 which is projected through the clear portion of the matte. The unwanted portions of the basic picture 10 are, in effect, blotted out by the opaque or dark portions of the matte 11. These dark portions may remain of the same size and shape for a selected scene but preferably gradually change as a scene advances so that the change from one scene to a succeeding scene need not be abrupt. By moving the projector 12 toward or away from the reflector 13 or moving the camera 14 toward or away from the screen, enlargement or reduction of the picture photographed by the camera as appropriately framed by the matte 11 can be simultaneously accomplished.

The improved method is also advantageous in obtaining unusual transitional effects from one scene to another, and to this end, I employ a second projector 17 in which there is a second print 18 of a basic picture and its associated matte 19. This projector is likewise schematically illustrated as being movable toward and away from the screen 13 by apparatus 20.

When two projectors are employed 13 may be in the form of a platinized mirror which will reflect the image projected by projector 12 and conduct the image projected by projector 17. In the alternative, both projectors and their associated mattes may be simultaneously projected in synchronism with each other and with the camera 14 onto a screen somewhat in the manner illustrated in FIG. 7 of my prior patent. When two projectors and two basic pictures and their associated mattes are simultaneously projected one matte is the reciprocal of the other. That is, one matte such as the matte 19 may be regarded as a negative matte and the matte 11 under these circumstances, is a positive matte.

Figure 2:
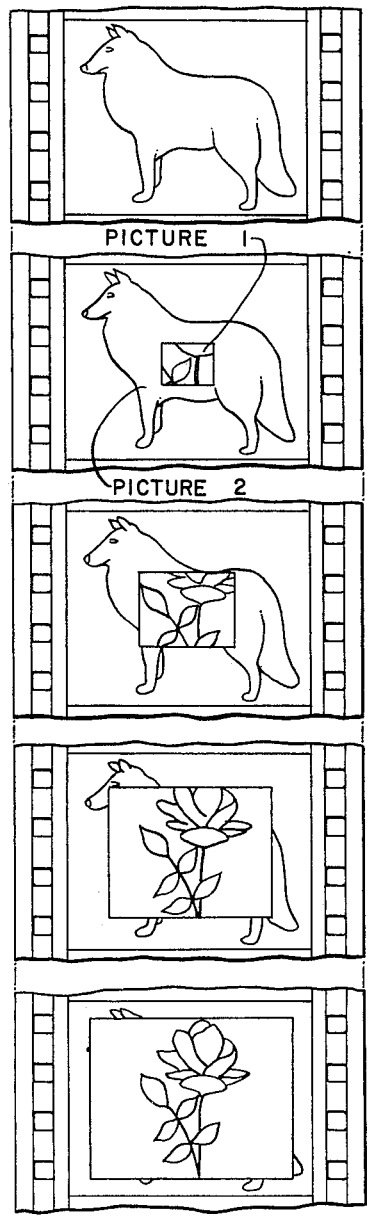
FIG. 2 is a group of selected frames of a motion picture illustrating one form of transitional effect that can be obtained in accordance with the present method.

By way of illustration of one form of transitional effect that may be produced there is illustrated in the top frame of FIG. 2 a picture obtained from basic picture 18 while the matte 19 is entirely clear. When this frame was being projected by projector 17 the positive matte 11 was entirely opaque. In the succeeding frame next below it will be observed that the basic picture projected from film 18 has remained substantially the same, but a portion thereof has been blotted out by opaque portion on the center of matte 19. A corresponding central portion of the positive matte 11 has been left clear so that portion of basic picture 10 can be simultaneously projected therethrough. This portion of basic picture 10 which is projected through the clear portion of matte 11 occupies the area of basic picture 18 that was blotted out by the opaque portion of matte 19. As the frames in FIG. 2 progress from top to bottom, it will be observed that the portion of basic picture 10 photographed by camera 14 has gradually and continuously increased in size so that in the lowermost frame this portion occupies nearly the entire available area of the frame. Ultimately, basic picture 10 may occupy the complete frame and basic picture 18 may have disappeared entirely. In this manner there may be a continuous and gradual transitional effect from one scene to another wherein one picture gradually occupies the entire area of the frame as recorded by the camera 14. By moving either the camera or either or both of the projectors toward or away from the reflector 13 reduction of picture size or enlargement may be accomplished as desired. Without compensating for the movement of the camera by changing focus the image may be out of focus and consequently may become blurred. Furthermore, by appropriately producing mattes 11 and 19 which are the reciprocal of each other either basic picture as photographed by camera 14 may or may not occupy the full available area on the reflector from which the picture as photographed by camera 14 is reflected.

Figure 3:
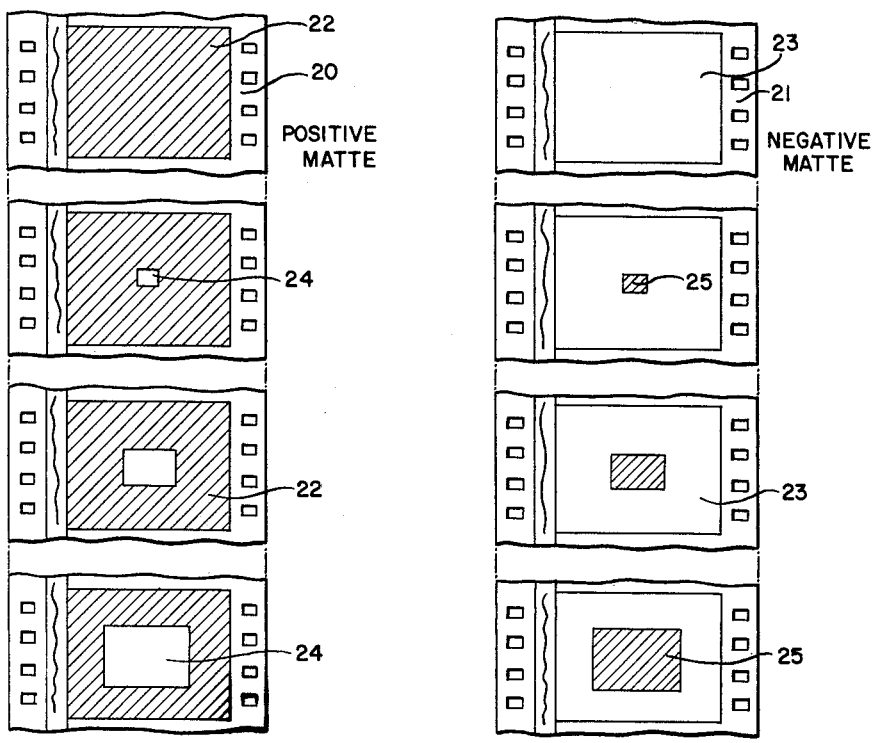
FIG. 3 illustrates positive and negative mattes, one of which is the reciprocal of the other which are used in conjunction with the present method and apparatus.

As illustrative of the types of mattes which may be employed in conjunction with the present method and apparatus, there is illustrated in FIG. 3 a representative form of reciprocal mattes. One of these mattes indicated at 20, may be regarded as the positive matte that is used in conjunction with one basic picture and the other, indicated at 21, may be regarded as the negative matte which is used in conjunction with the other basic picture. As illustrated in this figure, the uppermost frame of the matte 20 is completely opaque over the entire portion of the picture area of the print as indicated at 22. The corresponding frame of the negative matte 21 is completely clear as at 23 over the corresponding area. In a lower frame of the positive matte 20 a portion of the opaque area has been rendered clear as at 24, and on the negative matte there is a corresponding area at 25 that has been rendered opaque. The areas 24 and 25, respectively, change in size with the progression of frames on the two mattes. Furthermore, these areas need not retain the proportions of the complete picture frame but may progressively alter from a picture that is wider than high as illustrated, into a picture which is higher than wide and which when projected, will occupy only a portion of the screen area.

Figure 4:
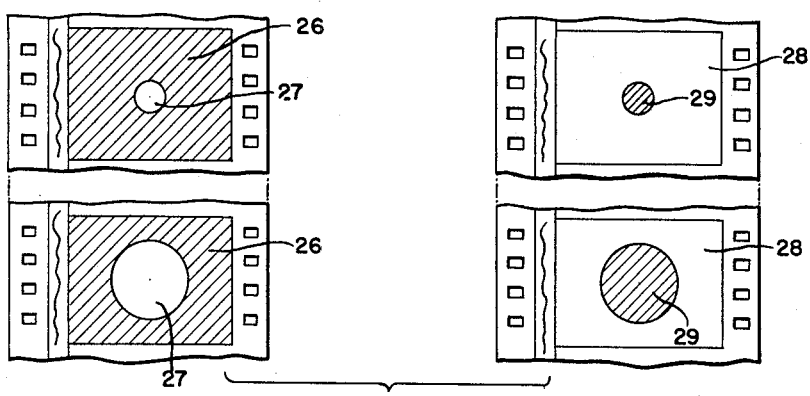
FIG. 4 is a view similar to FIG. 3, but illustrating mattes which are the reciprocal of each other and which may be of different design.

Similar transitional effects may be obtained in altering the shape of the picture as illustrated in FIG. 4, wherein the positive matte is largely opaque as at 26, except for a small clear area 27. The negative matte at the corresponding frame is largely clear as at 28 except for a small opaque area 29. In rendering the transition through a successive number of frames from the upper frames illustrated in FIG. 4 to the lower frames, the shape of the picture may continue to remain circular as illustrated or it may be changed to any other desired shape that may be used to accentuate certain prominent dimensions that it is desired to emphasize in the picture.

Thus the improved method not only provides novel transitional effects, but enables pictures to be produced of constantly changing size and shape which will enable desired dimensions of height or expanse to be emphasized.

Various changes may be made in the details of construction without departing from the spirit and scope of the invention as defined by the appended claim.

I claim:

The method of making motion pictures which includes the step of consecutively projecting the frames of a motion picture film strip and the frames of a matte strip onto one side of a light-transmitting reflector, simultaneously and in synchronism therewith projecting consecutively the frames of another motion picture film strip and the frames of a matte strip which matte strip is the reciprocal of the first-mentioned matte strip onto the other side of the reflector with the images of the frames of all strips in registration with each other, and photographically recording on the consecutive frames of a film strip the composite image resulting from having simultaneously projected consecutively the successive frames of both film strips and of the two matte strips one of which is the reciprocal of the other.

References Cited in the file of this patent

UNITED STATES PATENTS

| 1,508,509 | Douglass | Sept. 16, 1924 |
| 1,899,032 | Handschiegl | Feb. 28, 1933 |
| 2,014,435 | Jackman | Sept. 17, 1935 |
| 2,054,401 | Whitman | Sept. 15, 1936 |
| 2,123,529 | Goosson | July 12, 1938 |
| 2,133,085 | Draper | Oct. 11, 1938 |

FOREIGN PATENTS

| 309,869 | Great Britain | May 3, 1929 |

OTHER REFERENCES

Lyman, D.: "Five Ways To Make Wipes," pages 40, 41 in PSA Journal, February 1959.